(12) United States Patent
Lepage

(10) Patent No.: US 11,327,053 B2
(45) Date of Patent: May 10, 2022

(54) IN-LINE TUBE INSPECTION

(71) Applicant: Olympus NDT Canada Inc., Québec (CA)

(72) Inventor: Benoit Lepage, L'Ancienne-Lorette (CA)

(73) Assignee: Olympus America Inc., Center Valley, PA (US)

( * ) Notice: Subject to any disclaimer, the term of this patent is extended or adjusted under 35 U.S.C. 154(b) by 72 days.

(21) Appl. No.: 15/930,038

(22) Filed: May 12, 2020

(65) Prior Publication Data

US 2021/0356438 A1 Nov. 18, 2021

(51) Int. Cl.
- *G01N 29/27* (2006.01)
- *G01N 29/28* (2006.01)
- *G01N 29/04* (2006.01)

(52) U.S. Cl.
CPC ........... *G01N 29/27* (2013.01); *G01N 29/043* (2013.01); *G01N 29/28* (2013.01); *G01N 2291/0289* (2013.01); *G01N 2291/106* (2013.01); *G01N 2291/262* (2013.01)

(58) Field of Classification Search
CPC ...... G01N 29/27; G01N 29/043; G01N 29/28; G01N 2291/0289; G01N 2291/106; G01N 2291/262
See application file for complete search history.

(56) References Cited

U.S. PATENT DOCUMENTS

| | | | |
|---|---|---|---|
| 3,678,735 A | 7/1972 | Boulanger et al. | |
| 4,404,853 A * | 9/1983 | Livingston | E21B 17/006 73/622 |
| 4,587,849 A * | 5/1986 | Gross | G01N 29/26 73/159 |
| 6,739,188 B1 | 5/2004 | Prause | |
| 6,935,178 B2 | 8/2005 | Prause | |
| 2011/0072905 A1* | 3/2011 | Lam | G01N 29/262 73/622 |
| 2020/0034495 A1* | 1/2020 | Riding | G01N 29/07 |

FOREIGN PATENT DOCUMENTS

WO  WO-2021226712 A1  11/2021

OTHER PUBLICATIONS

"Echograph—HRPR", Karl Deutsch, (Mar. 20, 2012), 4 pgs.
(Continued)

*Primary Examiner* — Tarun Sinha
(74) *Attorney, Agent, or Firm* — Schwegman Lundberg & Woessner, P.A.

(57) ABSTRACT

A system for non-destructively inspecting tubes is provided. The system may include a tank filled with a fluid, e.g., water. The tank may define an axial passage within it for tube insertion, and the tank may include an opening to the axial passage. A transducer probe may be disposed inside the tank and oriented toward the opening to the axial passage. The system may also include a movable seal including a chamber, configured to move axially in the axial passage, and a membrane positioned in the opening of the tank. During inspection, an acoustic pathway may be provided between the transducer probe and the tube, the pathway including fluid in the tank, the membrane, and fluid in the chamber.

19 Claims, 4 Drawing Sheets

(56) References Cited

OTHER PUBLICATIONS

"ROWA—B Series. Krautkramer Testing Machines (Brochure)", GE Measurement and Control, (2015), 2 pgs.
Ginzel, Ed, "Acoustic Properties of the Elastomeric Materials Aqualene and ACE", The e-Journal of Nondestructive Testing, vol. 20 No. 12, (Dec. 2015), 1-12.
"International Application Serial No. PCT/CA2021/050652, International Search Report dated Aug. 10, 2021", 3 pgs.
"International Application Serial No. PCT/CA2021/050652, Written Opinion dated Aug. 10, 2021", 4 pgs.

* cited by examiner

IN-LINE TUBE INSPECTION

TECHNICAL FIELD

The present disclosure generally relates to non-destructive, in-line tube inspection systems using immersed transducer probes.

BACKGROUND

After manufacturing but prior to installation, tubes can be inspected to ensure they do not contain flaws. Some inspection systems using non-destructive testing techniques require rotating the tubes to inspect the tube from various angles. However, in real-world inspection scenarios, tubular structures under test can be tens of meters long, so a large space is needed for such rotating inspection systems. Further, the tubes may need to be relocated from the production environment to a designated testing area, slowing production.

Some smaller in-line inspection systems can utilize immersion water chambers. Ultrasound transducer probes can be placed in a water tank, and the tubes can be placed on an in-line track moving through a hollow passage of the water tank. Generally, the water tank is opened during inspection and water pours from the tank over an inspection area of the tube providing a water conduit for the ultrasound signals. But these immersion testing systems can suffer from significant drawbacks. Bubbling, for example, can be an issue. In these immersion testing systems, water is moving at a relatively high-speed from the tank to the tube during testing, which can cause bubbles to form in the water. The bubbles, in turn, can attenuate and diffract the ultrasound signal, decreasing the accuracy of the measurements. Further, water that poured out of the tank during inspection must be replaced in between each tube inspection, producing possibly more bubbles in the water. Dirt can be another possible issue. During production or other handling, the tubes can accumulate dirt or other foreign material. The moving water can displace dirt from the tubes onto the immersed transducer probes, leading to less accurate results and more wear and tear on the transducer probes.

Moreover, although ends of a tube can be an important area for inspection due to possible flaws from milling, these immersion testing systems can have difficulty inspecting the ends of the tube. As discussed above, water is generally introduced after the front end of the tube has been inserted and traversed a certain distance through the tank. And because the approach mentioned above requires providing a uniform sheet of water at the interface at the interface between a transducer and the tube being inspected, testing on a tube typically cannot begin until the front end has passed the inspection points in the tank. Likewise, the back end of the tube may not be fully inspected because of the lack of the water interface as the tube is leaving the tank.

BRIEF DESCRIPTION OF THE DRAWINGS

Various ones of the appended drawings merely illustrate example implementations of the present disclosure and should not be considered as limiting its scope.

DETAILED DESCRIPTION

The inventor has recognized a need in the art for an inspection system that overcomes the challenges of tube inspection discussed above. Examples of the present invention provide a compact in-line inspection system. The compact inspection system can be therefore be placed in or near the tube production lines, allowing inspection of the tubes without slowing down production or requiring a large dedicated space. Examples of the present invention allow for improved testing by providing a water conduit for testing without requiring moving water that can disturb the testing. Moreover, examples of the present invention may allow inspection of the ends of a tube by enabling ultrasound inspection of the tubes using a water conduit.

This document describes an inspection system including a tank defining an axial passage for a tube to be inserted for inspection and including an opening to the axial passage. The inspection system also includes a transducer probe disposed inside the tank and oriented toward the opening and a movable seal including a chamber, configured to move axially inside the axial passage. The inspection system further includes a membrane positioned in the opening for inspection of the tube using the transducer probe, providing a pathway for an ultrasound signal to be transmitted from the transducer probe to the tube in response to the movable seal occupying a measurement position.

This document also describes a method comprising a traversing an axial passage defined by a tank with a tube being inspected. The traversing including detecting the tube at an initial location inside the axial passage; establishing a fluid in a chamber included in a seal, the seal occupying an initial axial location proximal with a front end of the tube; and moving the seal in an axial direction. The method also includes in response to the chamber becoming aligned with an opening of the tank sealed by a membrane, performing ultrasonic inspection of the tube using a transducer probe inside the tank.

This document further describes a system including a tank defining an axial passage for a tube to traverse for inspection, the tank including a plurality of openings to the axial passage. The system also includes a plurality of transducer probes disposed inside the tank in a radial arrangement around the axial passage, each transducer probe oriented towards one of the plurality of openings and at least one movable seal configured to move axially inside the axial passage. The system further includes a plurality of membranes, each membrane configured to be positioned at one of the plurality of openings for inspection of the tube by the plurality of transducer probes, each transducer probe to transmit ultrasound energy into the tube through fluid in the tank, one of the plurality of membranes, and fluid in one of a plurality of chambers.

Figure 1:
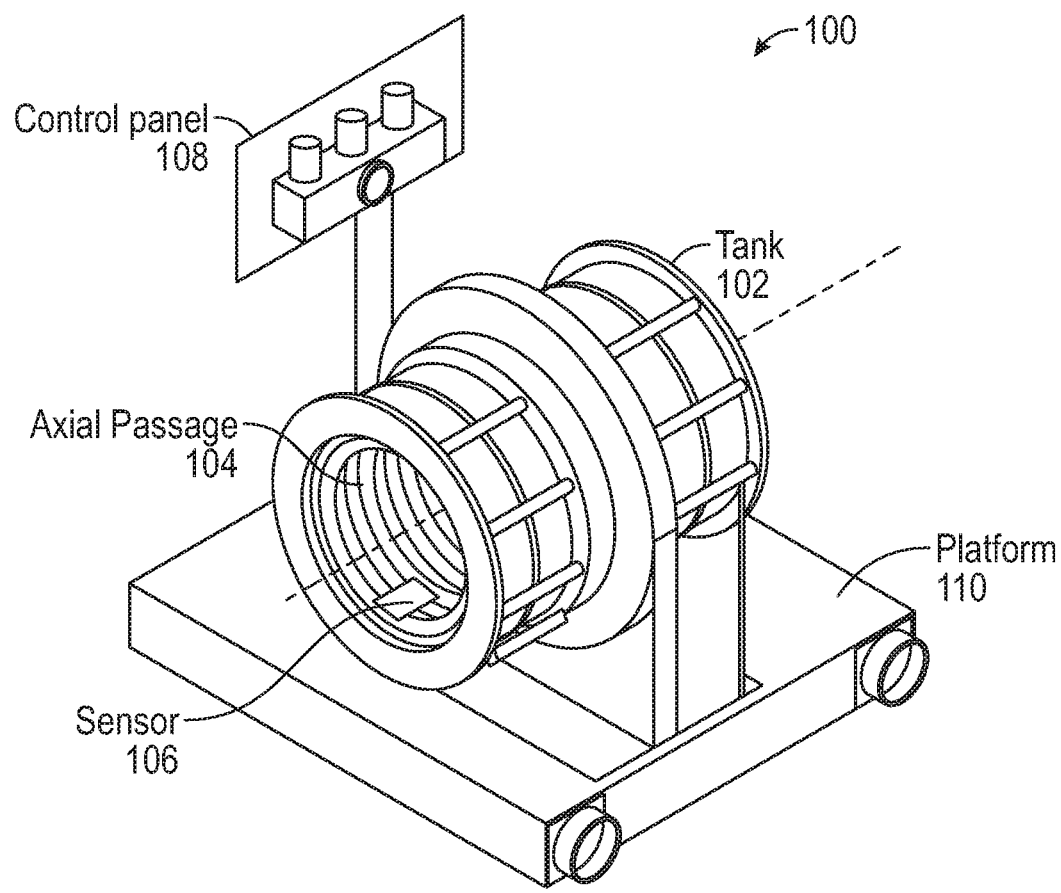
FIG. 1 illustrates a tube inspection system according to an example of the present invention.

FIG. 1 illustrates a tube inspection system 100 according to an example of the present invention. The tube inspection system 100 may include a tank 102 with a hollow axial passage 104 where tubes can be inserted for inspection. The tank 102 may include one or more sets of transducer probes (not shown) immersed in water for ultrasonic inspection of inserted tubes. The one or more set(s) of transducer probes may be arranged radially around the axial passage 104.

Tubes may traverse the axial passage 104 via a conveyer-type apparatus, for example an in-line track. The tube may enter the axial passage 104 through one end (e.g., proximal end) of the axial passage 104 and exit the axial passage 104 through the other end (e.g., distal end). In another example, the tube may enter and exit the axial passage 104 from the same end. In this example, the tube may enter the axial passage 104 from one end and traverse the axial passage 104 for inspection; after inspection, the tube may traverse the axial passage 104 back in the opposite direction and exit the axial passage 104 from the same end.

The inspection system 100 may also include a sensor 106 provided in the axial passage 104. The sensor 106 may detect an axial location of the tube as the tube traverses the axial passage. The sensor 106 may be provided as an integrated eddy current coil. For example, the sensor could be based on eddy current non-destructive sensing principles and be integrated in the axial passage 104 or in a seal (not shown) such as to detect the relative presence of the tube in the axial passage 104 (discussed below in further detail). Multiple sensors may be integrated, for example to provide detection of the front end of the tube being inserted and the back end of the tube being ejected.

The inspection system 100 may include a control panel 108. The control panel 108 may be coupled to the one or more set(s) of transducer probes and control their inspecting operations. The control panel 108 may provide an interface to control the operation of the transducer probes. The control panel 108 may include an input device (e.g., a keyboard, trackball, function keys or soft keys, mouse-interface, touchscreen, stylus, or the like) and an output device (e.g., a display for presentation of configuration information or results) to provide the results of the ultrasonic inspection performed by the transducer probes.

The inspection system 100 may be compact in size such that it can be placed in or near a production line for the tubes to be inspected. Hence, the inspection system 100 may be integrated in a production line. In another example, the tank 102 may be mounted on a platform 110 with wheels, making the inspection system 100 portable. Hence, the inspection system 100 may be moved to different locations in a manufacturing plant, making tube inspection more accessible and efficient.

Figure 2:
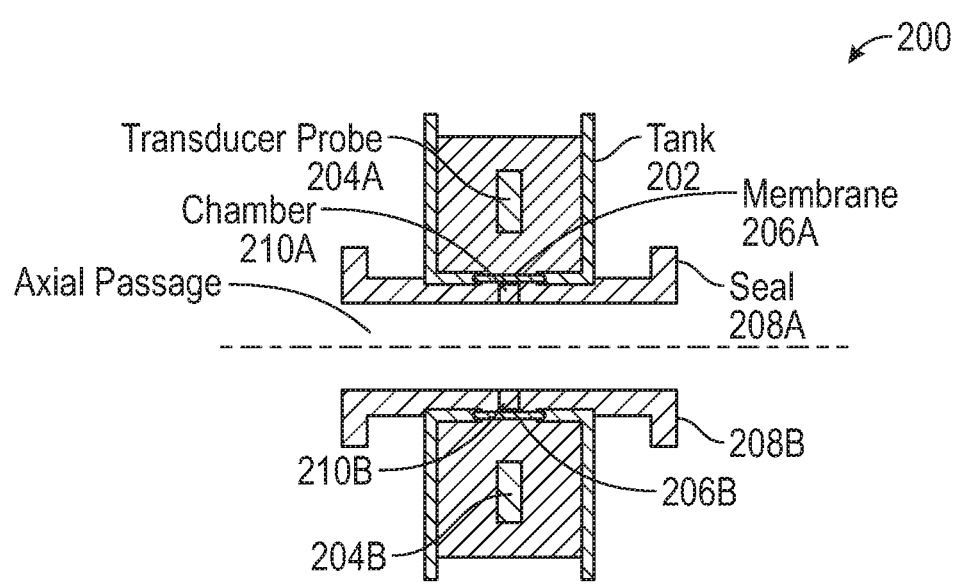
FIG. 2 illustrates a cross section of a tube inspection system according to an example of the present invention.

FIG. 2 illustrates a cross section of a tube inspection system according to an example of the present invention. A tank 202 may be provided and filled with water. The tank 202 may include transducer probes 204A, 204B immersed in the water. The tank 202 may include openings to the axial passage, where the tube to be inspected is inserted. Membranes 206A, 206B may be disposed in the openings of the tank 202. The membranes 206A, 206B may have an acoustic impedance that is substantially the same as water. For example, the membranes 206A, 206B may be provided using an Aqualene™ elastomer couplant, Acoustic Coupling Elastomer (ACE™), or the like. The transducer probes 204A, 204B may be oriented toward the respective openings in the tank 202, e.g., the membranes 206A, 206B, here, for ultrasound inspection, as explained in further detail below.

Seals 208A, 208B may be provided in the axial passage. The seals 208A, 208B may include chambers 410A, 410B. The chambers 210A, 210B may be filled with water for inspection. The seals 208A, 208B may be configured to move inside the axial passage, as described in further detail below. During inspection times, the seals 208A, 208B may be placed at measurement positions where the chambers 210A, 210B are positioned in front of the membranes 206A, 206B. Hence, the tank 202 and the chambers 210A, 210B may be substantially fluidically isolated in a region nearby the opening of the tank 202 because of the presence of the membranes 206A, 206B, which provides a physical barrier between them.

During inspection times, a pathway for ultrasound signals to be transmitted and/or received by the transducer probes is provided. The pathway may include the water in the tank where the transducer probes 204A, 204B are immersed, a respective membrane 206A, 206B, and water in a respective chamber 210A, 210B. For example, the transducer probe 204A may transmit an ultrasound signal for inspecting an inserted tube in the axial passage. The ultrasound signal may travel from the transducer probe 204A through the water in the tank 202, then through the membrane 206A (which may have an acoustic impedance that is substantially the same as water), then through water in the chamber 210A, and then into the tube located in the axial passage. Likewise, reflections or echoes of the ultrasound signal may travel the same path in reverse—e.g., from the tube then through water in the chamber 210A, then through the membrane 206A, then through water in the tank 202 where the reflections or echoes are received by the transducer probe 204A.

Moreover, during inspection, the water in the tank 202 and chambers 210A, 210B may be substantially still, e.g., motionless. Therefore, this design allows immersed ultrasound inspection without requiring water movement during inspection, reducing the amount of bubbles in the water in the ultrasound signal pathway and, consequently, improving accuracy of the ultrasound inspection.

Figure 3A:
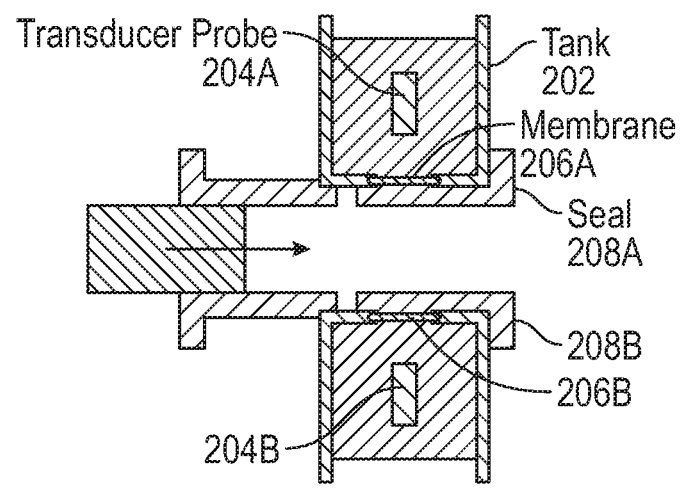
FIGS. 3A-3D illustrates an inspection method according to an example of the present invention.

FIGS. 3A-3D illustrate an inspection method according to an example of the present invention. For clarity and brevity, the inspection method will be described using only the components illustrated in the top half of the figures, e.g., the "A" components; the "B" components will operate in the same or similar manner as the "A" components. As shown in FIG. 3A, a tube may be inserted into the axial passage of the tank 202. At this time, the chamber 210A may be empty and be positioned away from the respective opening in the tank 202. The tube may begin traversing the axial passage at a specified rate, for example on a conveyer-type apparatus.

Figure 3B:
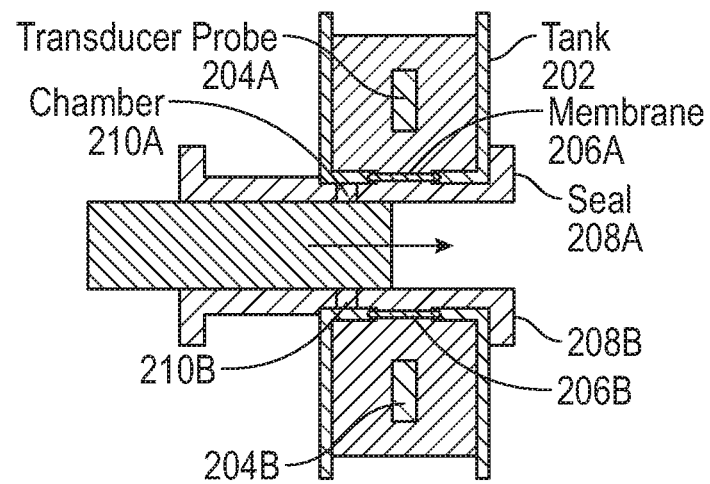

As shown in FIG. 3B, as the tube traverses the axial passage, the location of the tube may be detected at various locations (for example, by sensor 106). When the tube reaches an initial location inside the axial passage (for example, as detected by the sensor), water may be established in the chamber 210A, for example by filling it with water. The water may be poured from a separate container and may be decanted to reduce bubbling effect. The seal 208A, which includes chamber 210A, at this time may occupy an initial axial location. After the water is established in the chamber 210A, the seal 208A may move at the same specified rate as the tube in the same direction as the tube; hence, the seal 208A may move in conjunction with the tube inside the axial passage. In another example, the chamber 210A may be filled while the seal 208A is moving is moving.

Figure 3C:
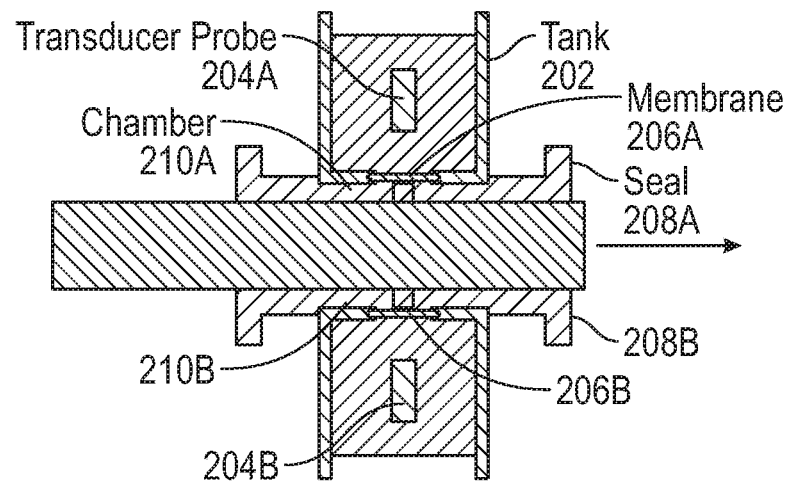

As shown in FIG. 3C, the seal 208A may move inside the axial passage until the chamber 210A disposed in the seal 208 becomes aligned with the respective opening in the tank 202 sealed by the membrane 206A. At that point, the seal 208A may be stopped, and a pathway for the ultrasound signals to be transmitted by the transducer probe 204A into the tube and for reflections and echoes to be received by the transducer probe 204A may be provided; the pathway including water in the tank 202, the membrane 206A, and water in the chamber 210A.

Next, ultrasonic inspection of the tube using transducer probe 204A may be performed. The tube may be inspected for flaws from end-to-end, including both ends, in a nondestructive manner using ultrasonic waves. The tube may continue traversing the axial passage until the inspection is completed.

The transducer probes 204A, 204B may include digital and analog circuitry, such as a front end-circuit including one or more transmit signal chains, receive signal chains, or switching circuitry (e.g., transmit/receive switching circuitry). The transmit signal chain may include amplifier and filter circuitry, such as to provide transmit pulses for delivery through an interconnect to a probe assembly for insonification of the tube, such as to image or otherwise detect a flaw on or within the tube structure by receiving scattered or reflected acoustic energy elicited in response to the insonification.

Different probe configurations may be used, such as multiple probe assemblies connected to a single test instrument, or multiple transducer arrays used with a single or multiple probe assemblies for tandem inspection. Similarly, a test protocol may be performed using coordination between multiple transducer probes 204A, 204B, such as in response to an overall test scheme established from the control panel 108, or established by another remote system such as a compute facility or general purpose computing device such as a laptop, tablet, smart-phone, robotic drone, desktop computer, or the like. The test scheme may be established according to a published standard or regulatory requirement and may be performed upon initial fabrication or on a recurring basis for ongoing surveillance, as illustrative examples.

The receive signal chain of the front-end circuit can include one or more filters or amplifier circuits, along with an analog-to-digital conversion facility, such as to digitize echo signals received using the transducer probes. Digitization can be performed coherently, such as to provide multiple channels of digitized data aligned or referenced to each other in time or phase. The front-end circuit can be coupled to and controlled by one or more processor circuits included as a portion of the inspection system. The processor circuit can be coupled to a memory circuit, such as to execute instructions that cause the inspection system to perform one or more of acoustic transmission, acoustic acquisition, processing, or storage of data relating to an acoustic inspection, or to otherwise perform techniques as shown and described herein.

Figure 3D:
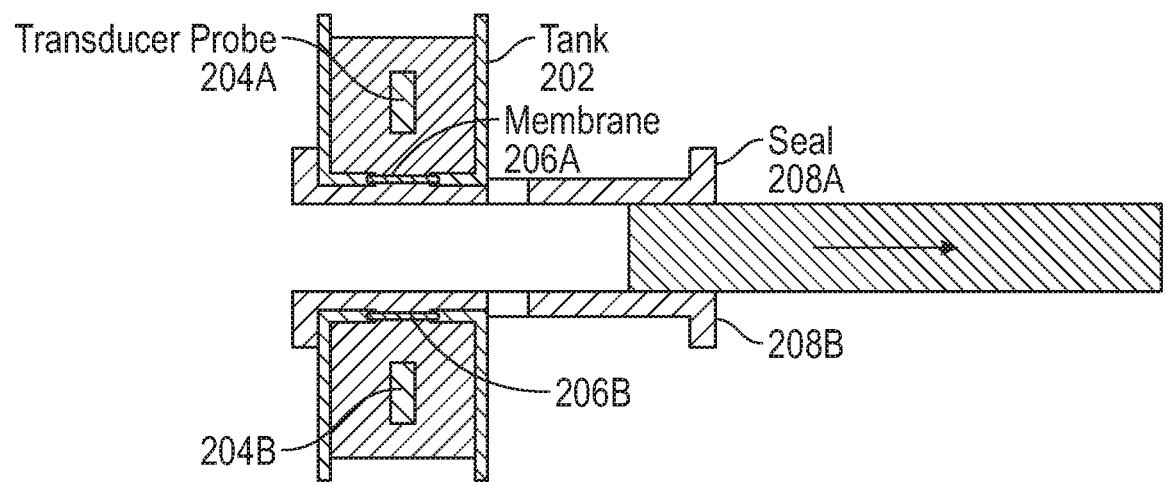

As shown in FIG. 3D, upon completion of the ultrasonic inspection, the tube may be ejected from the axial passage. Also, the movement of the seal 208A may be re-started in the axial direction, the same direction as the tube. After the chamber 210A clears the distal end of the tank 202, water from the chamber 210A may be discharged. For example, the chamber 210A may be opened and the water may be drained. The chamber 210A may be cleaned, for example by pressurized air or water. The seal 208A may then return to its initial axial location and another tube may be inserted into the proximal end of the tank 202 for inspection. Notably, the water in the tank 202 need not be discharged between tube inspection, e.g., when water from chamber 210A is discharged. This provides additional benefits of conserving water and maintaining the stillness of the water in the tank 202.

During inspection, the membrane and the chamber may be aligned to provide a pathway (water-membrane-water) for the ultrasonic wave having an acoustical impedance of water or substantially the same as water. Moreover, during inspection, the water in the tank and the chamber may be substantially still, leading to more accurate results.

Figure 4:
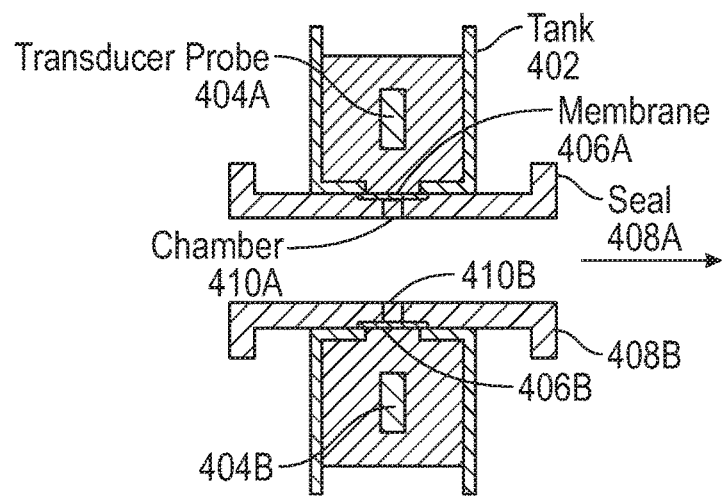
FIG. 4 illustrates a cross section of a tube inspection system according to another example of the present invention.

The membrane may be aligned with the opening in the tank during inspection times but need not be aligned with the opening at other times. FIG. 4 illustrates a cross section of a tube inspection system according to an example of the present invention. In this example, membranes 406A, 406B may be disposed in respective seals 408A, 408B adjacent to the chambers 410A, 410B also disposed in the seals 408A, 408B. Therefore, during non-inspection times, the openings in the tank 402 may be sealed by seals 408A, 408B and, during inspection times, by membranes 406A, 406B when the seals 408A, 408B are moved into measurement positions, aligning the membranes 406A, 406B (and the adjacent chambers 410A, 410B) with the openings in the tank 402.

Like the description of FIG. 2, the tank 402 may be provided and filled with water. The tank 402 may include transducer probes 404A, 404B immersed in the water. The tank 402 may include openings to the axial passage, where the tube is inserted. The transducer probes 404A, 404B may be oriented toward the respective openings in the tank 402.

Seals 408A, 408B may be provided in the axial passage. The seals 408A, 408B may include membranes 406A, 406B provided adjacent to respective chambers 410A, 410B. The membranes 406A, 406B may have an acoustic impedance that is substantially the same as water. For example, the membranes 406A, 406B may be provided using an Aqualene™ elastomer couplant, Acoustic Coupling Elastomer (ACE™), or the like. The chambers 410A, 410B may be filled with water for inspection. The seals 408A, 408B may be configured to move inside the axial passage. During inspection times, the seals 408A, 408B may be placed at measurement positions where the membranes 406A, 406B and adjacent chambers 410A, 410B are positioned in front of the respective openings in the tank. Hence, the tank 402 and the chambers 410A, 410B may be substantially fluidically isolated in a region nearby the opening of the tank 402 because of the presence of the membranes 406A, 406B, which provides a physical barrier between them. This may provide a water interface for ultrasound inspection but without the adverse effects of moving water, such as bubbling.

During inspection times, a pathway for ultrasound signals to be transmitted and/or received by the transducer probes is provided. The pathway may include the water in the tank where the transducer probes 404A, 404B are immersed, a respective membrane 406A, 406B, and water in a respective chamber 410A, 410B. For example, the transducer probe 404A may transmit an ultrasound signal for inspecting an inserted tube in the axial passage. The ultrasound signal may travel from the transducer probe 404A through the water in the tank 402, then through the membrane 406A (which may have an acoustic impedance that is substantially the same as water), then through water in the chamber 408A, and then into the tube located in the axial passage. Likewise, reflections or echoes of the ultrasound signal may travel the same path in reverse—e.g., from the tube then through water in the chamber 408A, then through the membrane 406A, then through water in the tank 402 where the reflections or echoes are received by the transducer probe 404A.

Moreover, during inspection, the water in the tank 402 and chambers 410A, 410B may be substantially still, e.g., motionless. Therefore, this design allows immersed ultrasound inspection without requiring water movement during inspection, reducing the amount of bubbles in the water in the ultrasound signal pathway and, consequently, improving accuracy of the ultrasound inspection.

Figure 5:
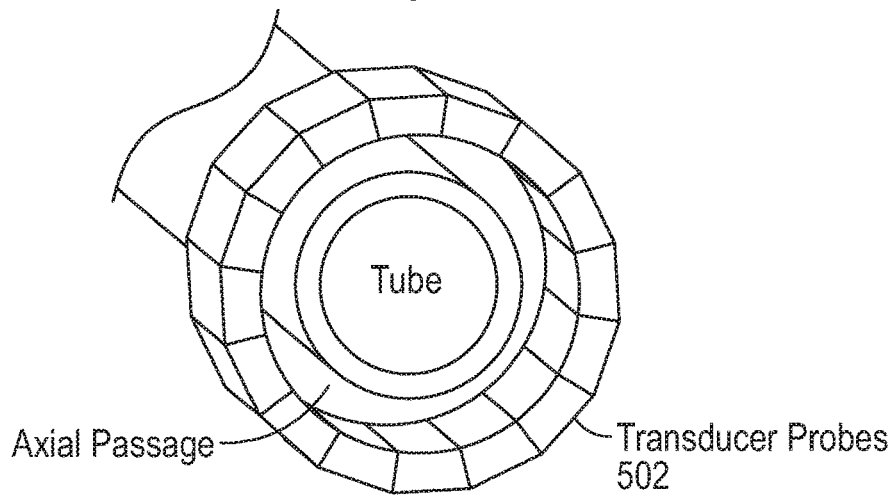
FIG. 5 illustrates a transducer configuration according to an example of the present invention.

The transducer probes described herein may be incased in a housing as they are immersed in water. The transducer probes in the tank may be arranged radially around the axial passage. FIG. 5 illustrates a transducer arrangement according to an example of the present invention. Here, a set of transducer probes 502 are illustrated, and the transducer probes 502 may be arranged in a continuous fashion. During inspection, the transducer probes 502 may operate simultaneously, acting as one probe. The inspection sequence may be clockwise, counterclockwise, or other configurable patterns.

Figure 6:
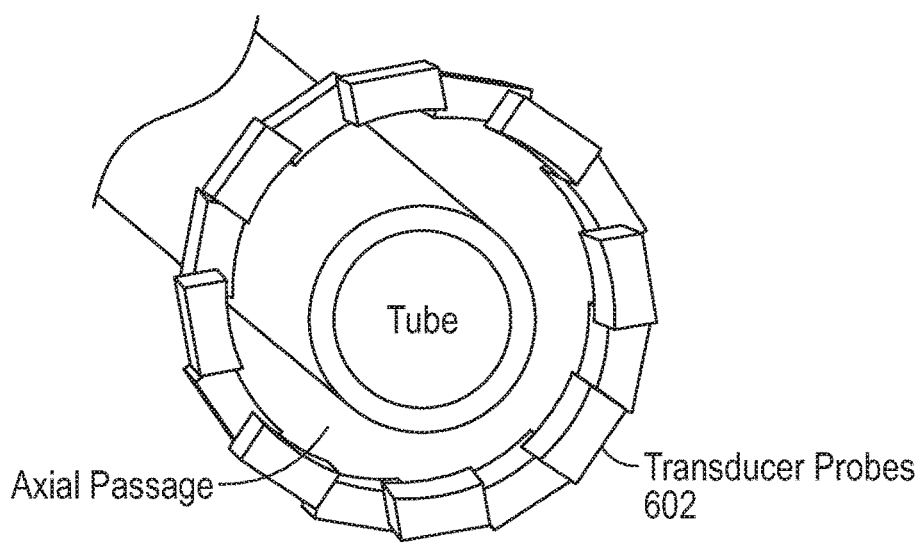
FIG. 6 illustrates a transducer configuration according to another example of the present invention.

FIG. 6 illustrates a transducer arrangement according to an example of the present invention. Here, a set of transducer probes 602 are illustrated, and the transducer probes 602 may be arranged in a staggered fashion. During inspection, the transducer probes 602 may perform inspection sequentially, e.g., one after another. The inspection sequence may be clockwise, counterclockwise, or other configurable patterns. Moreover, inspection systems as described herein may include a plurality of sets of transducer probes, each set arranged radially around the axial passage at different axial locations.

Different inspection modes may be provided. For example, inspection modes for detecting volumetric flaws, dimensional tube characteristics, clockwise inspection for cracks, counterclockwise inspection for crack may be provided. Oblique and/or transverse crack detection may be provided by using a matrix probe array with additional test modes. In an example using Phase Array Ultrasound Testing (PAUT), multiple PAUT beams may be utilized. Moreover, other inspection schemes, such as Full Matrix Capture/Total Focusing Method may be utilized.

Other fluids or couplants besides water may be used in the tube inspection systems described herein. For example, water-based mixtures may be used. In another example, glycerin may be used. The acoustic impedance of the membranes may match the acoustic impedance of the fluid or couplant.

Several examples or implementations of the invention are specifically illustrated and/or described herein. However, it will be appreciated that modifications and variations of the invention are covered by the above teachings and within the purview of the appended claims without departing from the intended scope of the invention.

Although the implementations of the present disclosure have been described with reference to specific example implementations, it will be evident that various modifications and changes may be made to these implementations without departing from the broader scope of the inventive subject matter. Accordingly, the specification and drawings are to be regarded in an illustrative rather than a restrictive sense. The accompanying drawings that form a part hereof show, by way of illustration, and not of limitation, specific implementations in which the subject matter may be practiced. The implementations illustrated are described in sufficient detail to enable those skilled in the art to practice the teachings disclosed herein. Other implementations may be used and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

What is claimed is:

1. An inspection system comprising:
a tank defining an axial passage for a tube to be inserted for inspection and including an opening to the axial passage;
a transducer probe disposed inside the tank and oriented toward the opening;
a movable seal including a chamber, configured to move axially inside the axial passage; and
a membrane positioned in the opening for inspection of the tube using the transducer probe, providing a pathway for an ultrasound signal to be transmitted from the transducer probe to the tube in response to the movable seal occupying a measurement position,
wherein the pathway includes fluid in the tank, the membrane, and fluid in the chamber and wherein the tank and chamber are substantially fluidically isolated.

2. The inspection system of claim 1, wherein the pathway includes water in the tank, the membrane, and water in the chamber, and wherein the membrane comprises material having an acoustic impedance that is substantially same as water.

3. The inspection system of claim 2, wherein the membrane comprises an elastomer couplant.

4. The inspection system of claim 1, further comprising:
a sensor to detect an axial location of the tube along the axial passage.

5. The inspection system of claim 4, wherein the chamber is configured to be filled with a fluid based on detection of the tube at an initial location in the axial passage by the sensor.

6. The inspection system of claim 4, wherein the sensor comprises an eddy current coil sensor.

7. The inspection system of claim 1, further comprising:
a plurality of transducer probes disposed inside the tank in an arrangement radially around the axial passage, wherein the transducer probe is one amongst the plurality of transducer probes, wherein the tank includes a plurality of openings, one opening for each of the plurality of transducer probes.

8. The inspection system of claim 7, wherein the plurality of transducer probes are staggered radially around the axial passage.

9. The inspection system of claim 1, wherein the membrane is disposed in the opening of the tank.

10. The inspection system of claim 1, wherein the membrane is disposed in the seal and is configured to be positioned in the opening upon the movable seal occupying the measurement position.

11. A method comprising:
traversing an axial passage defined by a tank with a tube being inspected, the traversing including:
detecting the tube at an initial location inside the axial passage;
establishing a fluid in a chamber included in a seal, the seal occupying an initial axial location proximal with a front end of the tube; and
moving the seal in an axial direction;
in response to the chamber becoming aligned with an opening of the tank sealed by a membrane, performing ultrasonic inspection of the tube using a transducer probe inside the tank; and
discharging the fluid from the chamber without requiring discharge of fluid from the tank.

12. The method of claim 11, wherein ultrasound energy is transmitted by the transducer probe to the tube through a pathway including fluid in the tank, the membrane, and fluid in the chamber.

13. The method of claim 11, wherein the fluid is water, and wherein the membrane comprises material having an acoustic impedance that is substantially same as water.

14. The method of claim 13, wherein the membrane comprises an elastomer couplant.

15. The method of claim 11, further comprising:
upon completion of the ultrasonic inspection, removing the tube from the axial passage;
discharging the fluid from the chamber; and
cleaning the chamber prior to inspecting another tube.

16. A system comprising:
a tank defining an axial passage for a tube to traverse for inspection, the tank including a plurality of openings to the axial passage;
a plurality of transducer probes disposed inside the tank in a radial arrangement around the axial passage, each transducer probe oriented towards one of the plurality of openings;
at least one movable seal configured to move axially inside the axial passage; and
a plurality of membranes, each membrane configured to be positioned at one of the plurality of openings for inspection of the tube by the plurality of transducer probes, each transducer probe to transmit ultrasound energy into the tube through fluid in the tank, one of the plurality of membranes, and fluid in one of a plurality of chambers, wherein the tank and the plurality of chambers are substantially fluidically isolated.

17. The system of claim 16, wherein the fluid is water, and wherein the membranes comprise material having an acoustic impedance that is substantially same as water.

18. The system of claim 17, wherein the membranes comprise an elastomer couplant.

19. The system of claim 16, further comprising:
a sensor to detect an axial location of the tube along the axial passage.

* * * * *